United States Patent [19]

Shukushima

[11] Patent Number: 5,650,205
[45] Date of Patent: Jul. 22, 1997

[54] FLAME-RETARDANT RESIN COMPOSITION, ELECTRIC WIRE USING SAME, AND TUBE MADE OF SAME

[75] Inventor: Satoshi Shukushima, Osaka, Japan

[73] Assignee: Sumitomo Electric Industries, Ltd., Osaka, Japan

[21] Appl. No.: 45,253

[22] Filed: Apr. 13, 1993

[30] Foreign Application Priority Data

Apr. 14, 1992 [JP] Japan .................................. 4-119610

[51] Int. Cl.$^6$ .................................. H01B 7/22; H01B 7/34
[52] U.S. Cl. .................... 428/35.8; 428/375; 428/461; 428/463; 428/921; 174/110 SR; 174/110 PM; 174/110 V; 524/225; 524/412; 525/227; 525/231
[58] Field of Search ........................ 524/225, 411, 524/412; 428/35.2, 34.9, 461, 463, 921, 35.8, 458, 375, 383; 174/DIG. 8, 110 SR, 110 N, 110 PM, 110 V; 525/222, 227, 231

[56] References Cited

U.S. PATENT DOCUMENTS

| | | | |
|---|---|---|---|
| 3,912,792 | 10/1975 | Touval | 524/225 |
| 3,926,876 | 12/1975 | Fukushima et al. | 524/225 |
| 4,404,361 | 9/1983 | Barda | 524/411 |
| 4,407,992 | 10/1983 | Keogh | 524/411 |
| 4,879,329 | 11/1989 | Hongo et al. | 524/411 |
| 4,965,021 | 10/1990 | Geovlette et al. | 524/411 |
| 5,059,650 | 10/1991 | Goettsch et al. | 524/411 |
| 5,116,898 | 5/1992 | Schleifstein | 524/371 |

FOREIGN PATENT DOCUMENTS

| | | |
|---|---|---|
| 55-075445 | 6/1980 | Japan . |
| 0218432 | 1/1990 | Japan . |
| 3181534 | 8/1991 | Japan . |
| 1075166 | 7/1967 | United Kingdom . |

*Primary Examiner*—Rena Dye
*Attorney, Agent, or Firm*—Sughrue, Mion, Zinn, Macpeak & Seas

[57] ABSTRACT

A flame-retardant resin composition comprising 100 parts by weight of a thermoplastic resin, from 10 to 80 parts by weight of a bis(halogenophenyl)terephthalamide, and from 5 to 40 parts by weight of antimony trioxide; an electric wire comprising a conductor having thereon an insulating layer comprising the resin composition; and a tube or a heat-shrinkable tube comprising the resin composition.

3 Claims, No Drawings

FLAME-RETARDANT RESIN COMPOSITION, ELECTRIC WIRE USING SAME, AND TUBE MADE OF SAME

FIELD OF THE INVENTION

The present invention relates to a resin composition which is excellent in flame retardancy, heat resistance, and mechanical properties, and is also free from blooming of a flame retardant. The present invention also relates to an electric wire and a tube both comprising the resin composition.

BACKGROUND OF THE INVENTION

Electric wire coatings, tubes, especially heat-shrinkable tubes, and the like are formed from polyolefin resins because of the excellent processability, chemical resistance, pliability, and electrical characteristics of the resins. Since polyolefin resins in themselves are a combustible material, flame retardancy is imparted to the resins by incorporating thereinto a flame retardant and a flame retardation aid.

In addition to the flame retardancy, thermal stability is also required of electric wires and tubes.

Decabromodiphenyl ether is known as a flame retardant having properties of imparting both flame retardancy and thermal stability. However, this flame retardant has a problem that it migrates to the resin surface to form a bloom with the lapse of time, thereby to considerably impair the appearance of the product.

In order to overcome the above problem, JP-A-1-153742 discloses a flame-retardant tube to which flame retardancy has been imparted by the combined use of ethylenebis (tetrabromophthalimide) and dodecachlorododecahydrodibenzocyclooctene. The tube is excellent in flame retardant properties and thermal stability and free from flame retardant blooming. (The term "JP-A" as used herein means an "unexamined published Japanese patent application".)

In the case where a high degree of flame retardancy is to be obtained, a large amount of a flame retardant should be incorporated. However, there has been a problem that if such flame retardants as ethylenebis(tetrabromophthalimide) and dodecachlorododecahydrodibenzocyclooctene are added to a resin in a large amount, the thermal stability of the resin is impaired.

SUMMARY OF THE INVENTION

An object of the present invention is to provide a flame-retardant resin composition which is excellent in flame retardancy, heat resistance, and mechanical properties and is also free from blooming of a flame retardant.

Another object of the present invention is to provide an electric wire and a tube both comprising the resin composition.

The present inventors have made extensive studies in regard to the above prior art problem. As a result, it has been found that when a flame retardant comprising a bis (halogenophenyl)terephthalamide as a major component is used, a highly flame-retardant resin composition can be obtained which has excellent thermal stability and is also free from blooming of a flame retardant. The present invention has been completed based on this finding.

The present invention provides:

(1) A flame-retardant resin composition comprising 100 parts by weight of a thermoplastic resin, from 10 to 80 parts by weight of a bis(halogenophenyl)terephthalamide, and from 5 to 40 parts by weight of antimony trioxide;

(2) An electric wire comprising a conductor having thereon an insulating layer comprising the above resin composition; and (3) A tube and a heat-shrinkable tube each comprising the above resin composition.

DETAILED DESCRIPTION OF THE INVENTION

The thermoplastic resin contained in the resin composition of the present invention is not particularly limited. Examples thereof include ethylene-vinyl acetate copolymers; ethylene-acrylic ester copolymers such as ethylene-ethyl acrylate copolymers and ethylene-methyl acrylate copolymers; polyolefins such as polyethylene and polypropylene; thermoplastic resin elastomers such as polyester elastomers, polyurethane elastomers, polyolefin elastomers, and polyamide elastomers; poly(ethylene terephthalate); and poly(butylene terephthalate). Among these, ethylene-vinyl acetate copolymers, ethylene-ethyl acrylate copolymers, and ethylene-methyl acrylate copolymers are preferably used in the present invention, with ethylene-ethyl acrylate copolymers being more preferred. These may be used alone or in combination of two or more thereof.

The bis(halogenophenyl)terephthalamide as one component of the flame retardant employed in the present invention is represented by formula (1):

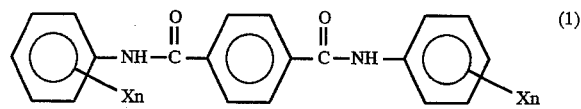

wherein X represents a halogen atom and n represents a natural number of from 1 to 5.

Examples of the halogen atom represented by X in formula (1) include fluorine, chlorine, bromine, and iodine. Of these, bromine is preferred since it is the most effective in flame retardancy. The larger the n, the better the flame retardancy. Therefore, bis(tribromophenyl)terephthalamide (n=3), bis(tetrabromophenyl)terephthalamide (n=4), and bis (pentabromophenyl)terephthalamide (n=5) are preferably used in the present invention. Among these, bis (tribromophenyl)terephthalamide (n=3) is generally used, since it is easily available as commercial products.

The composition of the present invention is obtained by incorporating from 10 to 80 parts by weight, preferably from 30 to 70 parts by weight, more preferably from 20 to 50 parts by weight, of a bis(halogenophenyl)terephthalamide and from 5 to 40 parts by weight, preferably from 10 to 30 parts by weight, of antimony trioxide into 100 parts by weight of a thermoplastic resin, especially an ethylene-based resin.

If the incorporated amount of a bis(halogenophenyl) terephthalamide is less than 10 parts by weight or that of antimony trioxide is less than 5 parts by weight, sufficient flame retardancy cannot be obtained. If the incorporated amount of the former compound is larger than 80 parts by weight or that of the latter is larger than 40 parts by weight, the heat resistance and mechanical properties of the resin composition are significantly reduced.

Besides the above-described ingredients, various kinds of other ingredients may be incorporated into the resin composition of the present invention, such as a flame retardation aid, a crosslinking agent, an antioxidant, a metal deactivator, a filler, a lubricant and the like.

Examples of the flame retardation aid include zinc borate, aluminum hydroxide, magnesium hydroxide, magnesium carbonate, magnesium oxide, molybdenum oxide, tin oxide, and zinc oxide. It is advantageous to incorporate such a flame retardation aid in an amount of from 5 to 30 parts by weight, preferably from 7 to 20 parts by weight, per 100 parts by weight of the resin. When the amount of the flame retardation aid incorporated is within that range, flame retardancy can be improved further. In particular, use of zinc borate brings about dramatically improved flame retardancy.

Examples of the crosslinking agent include organic peroxides such as dicumyl peroxide. Using such a crosslinking agent, the resin composition may be crosslinked chemically.

In an alternative method, the resin composition is crosslinked by being irradiated with electron beams. In this case, the dose of electron beams is preferably in the range of from 5 to 50 Mrad. If the electron beam dose is less than 5 Mrad, insufficient crosslinking results. If the dose exceeds 50 Mrad, the mechanical properties of the composition are impaired significantly.

In order to make the composition have soldering resistance (the property of not melting even in contact with molten solder), it may be crosslinked to a gel content of 50% or more by means of either chemical crosslinking or electron beam crosslinking.

The antioxidant is not particularly limited. Examples thereof include amine-type antioxidants such as 4,4'-dioctyldiphenylamine, N,N'-diphenyl-p-phenylenediamine, and polymer of 2,2,4-trimethyl-1,2-dihydroquinoline; phenolic antioxidants such as tetrakis[methylene-3-(3',5'-di-t-butyl-4'-hydroxyphenyl)propionato]methane, triethylene glycol bis[3-(3-t-butyl-5-methyl-4-hydroxyphenyl) propionate], and 6-(4-hydroxy-3,5-di-t-butylanilyl)-2,4-bis (octylthio)-1,3,5-triazine; and sulfur compound antioxidants such as 1,1'-thiobis(2-naphthol), 2-mercaptobenzimidazole, 2-mercaptomethylbenzimidazole, zinc salt of 2-mercaptomethylbenzimidazole, 1,3-bis (dimethylaminopropyl)-2-thiourea, β-alkyl thioester of propionic acid, and pentaerythritol tetrakis(β-laurylthiopropionate). The antioxidant is generally incorporated in an amount of from 0.1 to 20 parts by weight per 100 parts by weight of the resin.

The metal deactivator is not particularly limited. Examples thereof include 1,2,3-benzotriazole, potassium salt of tolyltriazole, 3-(N-salicylol)amino-1,2,4-triazole, N,N'-bis(3-(3,5-di-t-butyl-4-hydroxyphenyl)propionyl)-hydrazine, a triazine derivative mixture ("Mark ZS-27", manufactured by Adeka Argus Chemical Co., Ltd., Japan), decamethylenedicarboxylic acid disalicyloylhydrazide, and an acid-amine derivative ("Stabinol CS-42", manufactured by Sumitomo Chemical Co., Japan). The metal deactivator is generally incorporated in an amount of from 0 to 10 parts by weight per 100 parts by weight of the resin.

If the composition is in contact with a metal such as copper, deterioration of the material is accelerated by the catalytic action of the metal. However, the deterioration by metal can be suppressed by the addition of a metal deactivator, whereby the insulating material can retain higher heat resistance.

The filler is not particularly limited. Examples thereof include talc, clay, calcium carbonate, silicic anhydride, calcium silicate, and carbon black. The filler is generally incorporated in an amount of from 0 to 100 parts by weight per 100 parts by weight of the resin.

The lubricant is not particularly limited. Examples thereof include liquid paraffin, stearic acid, zinc stearate, and stearylamide. The lubricant is generally incorporated in an amount of from 0 to 3.0 parts by weight per 100 parts by weight of the resin.

The method for producing the flame-retardant resin composition of the present invention is not particularly limited. For example, the thermoplastic resin and the other ingredients are mixed and kneaded in an open roll at about 140° C. for 10 minutes. A pressure kneader and a Banbury mixer can also be used at a temperature above the melting point of the resin.

The flame-retardant resin composition of the present invention has both high thermal stability and excellent flame retardancy, and it can be used as an insulating layer or a heat-shrinkable material. The composition is therefore useful in applications such as electrical wires, heat-shrinkable tubes, and the like.

The electric wire of the present invention can be prepared by coating the flame-retardant resin composition of the present invention on a conductor. The conductor is not particularly limited in material and size thereof. Example thereof include a solid wire or a twisted wire of soft copper and tin-plated soft copper.

The method for coating the resin composition of the present invention on the conductor is not particularly limited and include, for example, extrusion coating at a temperature above the melting point of the resin. The coated resin composition may be crosslinked by irradiating with electron beams to enhance the heat resistance of the wire. In the case where the electron beam crosslinking is used, the thickness of the coated layer should be thinner than the penetration depth of the electron beams used. If it is too thick, the crosslinking becomes insufficient in the interior portion of the coated layer.

The tube of the present invention can be prepared by molding the flame-retardant resin composition of the present invention into a tube form. The molding method is not particularly limited and include, for example, extrusion molding at a temperature above the melting point of the resin. The tube may be crosslinked by irradiating with electron beams to enhance the heat resistance of the tube. In the case where the electron beam crosslinking is used, the thickness of the tube should be thinner than the penetration depth of the electron beams used.

The heat-shrinkable tube of the present invention can be prepared by expanding the diameter of the crosslinked tube at a temperature above the melting point of the resin and then rapidly cooling the tube while maintaining the expanded shape. Upon heating the heat-shrinkable tube, the tube shrinks to the size before expanding.

The present invention will be explained below in more detail with reference to the following examples, but the invention is not construed as being limited thereto.

EXAMPLES 1 TO 5 AND COMPARATIVE EXAMPLES 1 TO 3

Electric wires were prepared which had insulating layers respectively having the compositions shown in Table 1 below.

As a conductor, a soft copper wire having a diameter of 0.8 mm was used.

Each insulating layer was formed at a thickness of 0.4 mm by extruding on the conductor, and was then irradiated with electron beams at a dose of 20 Mrad to crosslink the insulating layer.

The thus-obtained insulated electric wires were subjected to an initial tensile strength measurement, a heat aging test, a vertical wire flame test for evaluating flame retardancy (UL Standard VW-1), and a test for evaluating the blooming of a flame retardant.

The results of the tests are shown in Table 1.

TABLE 1

|  | Comparative Example | | | Example | | | | |
| --- | --- | --- | --- | --- | --- | --- | --- | --- |
|  | 1 | 2 | 3 | 1 | 2 | 3 | 4 | 5 |
| EVA copolymer (1) | 100 | 100 | 100 | 100 | — | — | 50 | — |
| EEAc copolymer (2) | — | — | — | — | 100 | — | — | — |
| EMAc copolymer (3) | — | — | — | — | — | 100 | — | — |
| Polyethylene (4) | — | — | — | — | — | — | 50 | — |
| Polyester elastomer (5) | — | — | — | — | — | — | — | 100 |
| Bis(tribromophenyl)-terephthalamide | — | — | — | 40 | 40 | 40 | 40 | 40 |
| Ethylenebis(tetrabromo-phthalimide) | — | 15 | 40 | — | — | — | — | — |
| Dodecachlorododecahydro-dimethanodibenzo-cyclooctene | — | 5 | 15 | — | — | — | — | — |
| Decabromodiphenylether | 40 | — | — | — | — | — | — | — |
| Antimony trioxide | 15 | 15 | 15 | 15 | 15 | 15 | 15 | 15 |
| Zinc borate | 10 | 10 | 10 | 10 | 10 | 10 | 10 | 10 |
| Antioxidant (6) | 1 | 1 | 1 | 1 | 1 | 1 | 1 | 1 |
| Metal deactivator (7) | 0.5 | 0.5 | 0.5 | 0.5 | 0.5 | 0.5 | 0.5 | 0.5 |
| Electron beam dose (Mrad) | 20 | 20 | 20 | 20 | 20 | 20 | 20 | 20 |
| Vertical wire flame test (UL Standard VW-1) | A | B | A | A | A | A | A | A |
| Initial tensile strength (kg/mm$^2$) | 1.41 | 1.30 | 1.05 | 1.40 | 1.25 | 1.32 | 1.21 | 2.02 |
| Initial elongation (%) | 400 | 530 | 420 | 390 | 415 | 385 | 310 | 360 |
| Heat aging test* | A | B | B | A | A | A | A | A |
| Non-blooming property** | B | A | A | A | A | A | A | A |

Note:
*Heat aging test:
Each electric wire was heat-aged at 160° C. for 7 days in a Gear oven and then wound around the diameter thereof. The formation of cracking in the insulating layer was visually observed and evaluated as follows:
A: No cracking
B: Cracking occured
**Non-blooming property:
Each electric wire was allowed to stand for 1 month in a 50° C. thermostatic chamber, and the degree of resulting blooming was visually observed and evaluated as follows:
A: No blooming
B: Blooming occured
Ingredients:
(1) Ethylene-vinyl acetate copolymer
    (Vinyl acetate content: 15%; MI: 0.6)
(2) Ethylene-ethyl acrylate copolymer
    (Ethyl acrylate content: 15%; MI: 0.5)
(3) Ethylene-methyl acrylate copolymer
    (Methyl acrylate content: 17%; MI: 0.5)
(4) Polyethylene
    (Density: 0.92 g/cm$^3$)
(5) Polyester elastomer
    (melting point: 200° C; density: 1.21 g/cm$^3$)
(6) Tetrakis[methylene-3-(3',5'-di-t-butyl-4'-hydroxyphenyl)propionato]methane
(7) N,N'-bis[3-(3,5-di-t-butyl-4-hydroxyphenyl)propionyl]hydrazine The following were found from the tests. The use of decabromodiphenyl ether as a flame retardant in Comparative Example 1 resulted in blooming of the flame retardant to considerably impair the appearance of the product. In contrast, in Examples 1 to 5 in which a bis(halogenophenyl)-terephthalamide was used, no blooming of the flame retardant occurred.

Although the electric wires of Comparative Examples 2 and 3, in which ethylenebis(tetrabromophthalimide) and dodecachlorododecahydrodibenzocyclooctene were used in combination, were free from blooming of the flame retardant, their thermal stability was so poor that the coatings developed cracks when the electric wires were wound around the diameter thereof after 160° C. heat aging for 7 days.

In contrast, the electric wires of Examples 1 to 5, in which bis(tribromophenyl)terephthalamide was used, were so excellent in thermal stability that they developed no cracks even when wound around the diameter thereof after 160° C. heat aging for 7 days.

As described above, the resin composition of the present invention has high flame retardancy and high thermal stability and is also free from blooming of a flame retardant.

While the invention has been described in detail and with reference to specific embodiments thereof, it will be apparent to one skilled in the art that various changes and modifications can be made therein without departing from the spirit and scope thereof.

What is claimed is:

1. An electric wire comprising a conductor having thereon an insulating layer comprising a composition comprising 100 parts by weight of at least one thermoplastic resin selected from the group consisting of an ethylene-vinyl acetate copolymer, an ethylene-acrylic ester copolymer and a polyolefin, from 10 to 80 parts by weight of a [bis(halogenophenyl)-terephthalamide]bis(bromophenyl) terephthalamide, and from 5 to 40 parts by weight of antimony trioxide.

2. The electric wire according to claim 1, wherein said thermoplastic resin is selected from the group consisting of an ethylene-vinyl acetate copolymer, an ethylene-ethyl acrylate copolymer and an ethylene-methyl acrylate copolymer.

3. The electric wire according to claim 1, wherein said composition further comprises an antioxidant in an amount of 0.1 to 20 parts by weight per 100 parts by weight of the thermoplastic resin.

* * * * *